United States Patent [19]

Rice et al.

[11] Patent Number: 4,641,850

[45] Date of Patent: Feb. 10, 1987

[54] WHEELCHAIR ADAPTER WHEEL

[76] Inventors: James S. Rice, 2316 Jackson Ave.; William L. Klohn, 1100 3rd St., South, both of Naples, Fla. 33940

[21] Appl. No.: 769,347

[22] Filed: Aug. 26, 1985

[51] Int. Cl.[4] .......................... B62J 11/00; B62M 1/14

[52] U.S. Cl. .......................... 280/289 WC; 24/23 EE; 280/160; 301/39 CC; 301/40 R

[58] Field of Search ....... 280/289 R, 289 WC, 289 D, 280/242 WC, 160, 160.1, 5.2; 180/907, 8.2, 8.7, 9, 9.26, 9.3, 9.32, 9.34; 403/344; 297/DIG. 4; 301/39 CC, 41 R, 38 R, 40 R, 42; 152/217, 219, 220, 221, 222; 238/14; 24/20 EE, 23 EE, 265 C

[56] References Cited

U.S. PATENT DOCUMENTS

| | | | |
|---|---|---|---|
| 887,341 | 5/1908 | McDermott | 301/38 R |
| 1,072,687 | 9/1913 | Beauregard | 403/344 X |
| 1,843,751 | 2/1932 | Campbell | 301/39 CC |
| 2,441,471 | 5/1948 | Chausse | 152/220 |

FOREIGN PATENT DOCUMENTS

| | | | |
|---|---|---|---|
| 619977 | 4/1927 | France | 301/39 CC |
| 2423212 | 11/1979 | France | 297/DIG. 4 |
| 447034 | 8/1934 | United Kingdom | 301/40 R |

*Primary Examiner*—John J. Love
*Assistant Examiner*—Charles R. Watts
*Attorney, Agent, or Firm*—Brady, O'Boyle & Gates

[57] ABSTRACT

Thin wide metal bands encircle the propulsion wheels of a wheelchair to enable the chair to be operated on a beach or on other soft terrain. The somewhat flexible bands have separated ends which are drawn together and secured by an elastic connector web attached to one end portion of the band and carrying a connector strip having gripping fingers which engage in apertures provided in the other end portion of the band after the elastic connector web is stretched across a gap between the separated ends of the band. The band carries half-circle centering elements on its interior surface which engage over the tire of the wheelchair propulsion wheel.

8 Claims, 4 Drawing Figures

FIG.1
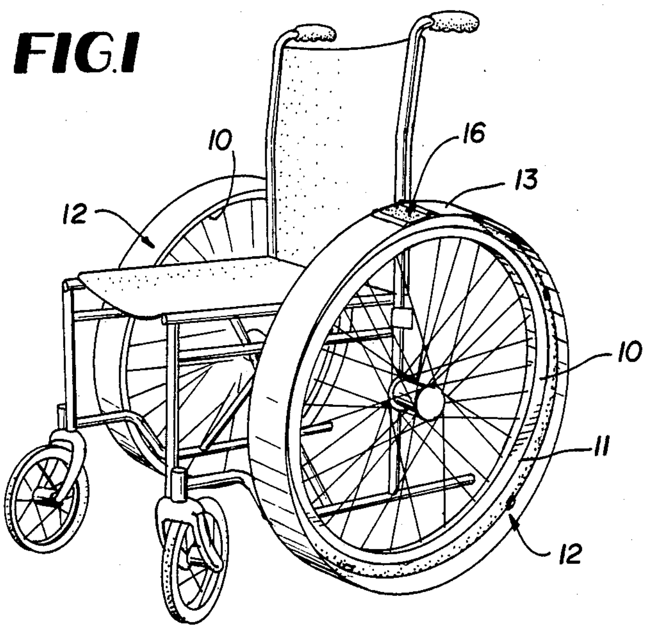
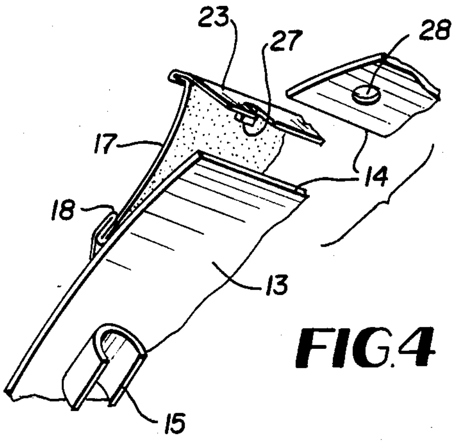
FIG.4
FIG.2
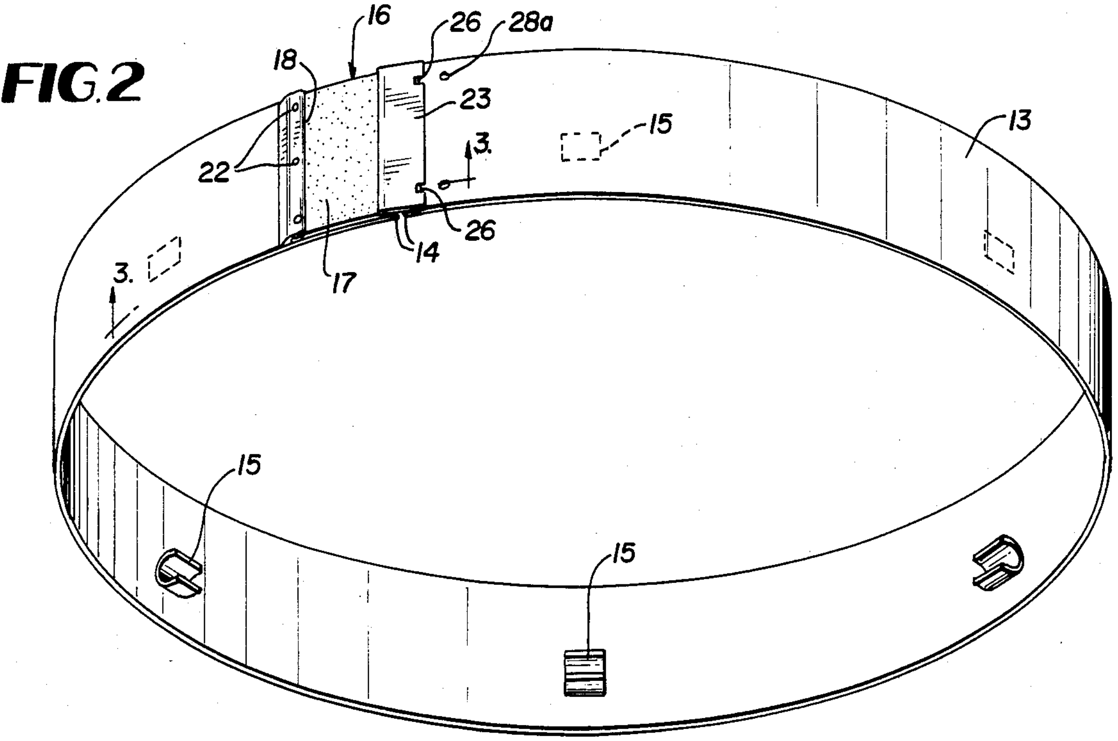
FIG.3
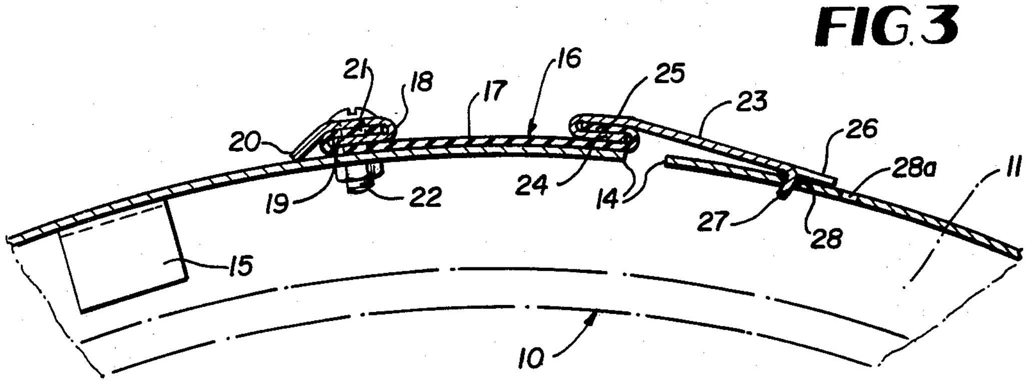

WHEELCHAIR ADAPTER WHEEL

BACKGROUND OF THE INVENTION

Users of conventional manually propelled wheelchairs find it impossible to use the chairs on sandy beaches or other soft terrain, and are generally restricted to using the wheelchairs on solid surfaces, both indoor and outdoors.

The objective of the present invention is to solve the above problem by providing a simplified, convenient and economical adapter wheel for the propulsion wheels of a wheelchair to enable the chair to be successfully used on soft terrain.

A further object of the invention is to provide a wheelchair adapter wheel which is very easy to install on and remove from each propulsion wheel of the chair and which is secured in the use position by a simple and effective elastic connector means which is easy to operate.

A further object of the invention is to provide an adapter wheel for wheelchairs in the form of a thin wide preferably metal band having separated ends which are drawn together and secured when the band is applied to the wheelchair propulsion wheel by an elastic connector means in the form of a stretchable web.

Still another object of the invention is to provide an adapter wheel of the above-mentioned type having circumferentially spaced centering elements on its interior surface which embrace the tire of the wheelchair propulsion wheel.

Another object of the invention is to provide a soft terrain adapter wheel for wheelchairs which is somewhat adjustable circumferentially to fit wheelchair propulsion wheels of slightly different diameters resulting from tire wear.

Other features and advantages of the invention will become apparent to those skilled in the art during the course of the following description.

BRIEF DESCRIPTION OF THE DRAWINGS

FIG. 1 is a perspective view of a wheelchair having propulsion wheels equipped with soft terrain adapter wheels in accordance with the present invention.

FIG. 2 is a perspective view of an adapter wheel for wheelchairs according to the invention.

FIG. 3 is a fragmentary vertical section taken on line 3—3 of FIG. 2.

FIG. 4 is a fragmentary perspective view of the adapter wheel showing its elastic connector means and means for centering it with respect to a wheelchair propulsion wheel.

DETAILED DESCRIPTION

Referring to the drawings in detail wherein like numerals designate like parts, a conventional hand-propelled wheelchair shown in FIG. 1 includes two identical propulsion wheels 10 each having a rubber tire 11. A soft terrain adapter wheel 12, according to the present invention, is applied removably to each propulsion wheel 10 to enable the wheelchair to operate on a beach, in mud or on other soft surfaces.

Each adapter wheel 12 is preferably formed from a thin wide circularly preshaped aluminum strip or band 13 whose width is preferably about $4\frac{3}{4}$". The preshaped band is sized to fit a conventional wheelchair propulsion wheel which normally measures $77\frac{1}{2}$" in circumference.

The band 13, which forms the body of the adapter wheel 12, has separated ends 14 which are readily adjustable toward and away from each other. On its interior surface and at its center of width, the band 13 has a plurality of preferably semi-circular centering elements 15 fixed thereto, with the axes of the elements 15 aligned circumferentially of the band or adapter wheel. Six or more of the centering elements 15 are normally provided although the number of these elements may vary. When the band 13 is applied around the wheelchair wheel 10, the semi-circular elements 15 embrace the tire 11, thus centering the adapter wheel 12 relative to the wheelchair wheel 10.

A very important feature of the present invention comprises an elastic connector means 16 across the gap between the separated edges 14 of the band 13. This elastic connector means comprises a preferably rubber stretchable web 17 of the same width as the aluminum band 13. A first connector plate 18 formed of stainless steel extends transversely across the exterior of the band 13 somewhat rearwardly of one end 14 thereof. The connector plate 18 is bent to form a reversely extending flange 19 beneath the body portion 20 of the plate and the rear end portion of the web 17 is folded and engaged in the space between the body portion 20 and flange 19 of the connector plate 18. The connector plate 18 is crimped or pressed across the flange 19 to tightly bind the folded portion 21 of the web 17 between the flange 19 and the body portion 20. Bolts 22 are employed to secure the connector plate 18 and web 17 to the band 13 and these bolts penetrate the connector plate, the elastic web and the band, as shown. The bolts 22 are transversely spaced across the adapter wheel, as shown in FIG. 2.

The connector means 16 further comprises a second or forward stainless steel connector plate 23 formed at its rear end to provide a bottom flange 24 spaced from the body of the plate 23. A reversely folded end portion 25 of the elastic web 17 is inserted between the flange 24 and the body of the plate 23 and is tightly crimped in place by pressing the flange 24 toward the body of the plate 23. The forward connector plate 23 is notched in its forward edge near its opposite sides as indicated at 26 to form a pair of radially inwardly projecting somewhat reversely inclined anchor claws 27 which are removably engageable through apertures 28 formed in the aluminum band 13 near but somewhat spaced from its other end 14, FIG. 3. In some cases, three or more claws 27 and apertures 28 may be provided across the band 13 and connector plate 23.

To compensate for slight differences in the size of wheelchair wheels caused by wear or other factors, an additional set or sets of apertures 28*a* are provided in the band 13, spaced slightly circumferentially of the apertures 28. The apertures 28*a* can also receive the claws 27, when required. When the claws 27 are in place in the apertures 28, there is still a gap or space between the ends 14 of the band 13, as shown in FIG. 3. In fact, the ends 14 may, in some cases, nearly abut each other but they do not overlap.

In applying the soft terrain adapter wheel to a wheelchair wheel 10, the band 13 with its ends 14 separated and unconnected is placed around the wheel 10, and the several half-circle centering elements 15 are engaged over the tire 11. Following this, the leading connector plate 23 is grasped and pulled forwardly to stretch the elastic web 17 and place it under tension. While so stretched, the claws 27 are engaged through the proper set of openings 28 or 28*a*, depending upon the size of the wheel and the fastening of the adapter wheel to the wheelchair wheel is completed. The elastic connector means 16 is very secure and the reversely angled claws 27 will not disengage themselves from the apertures 28 until positively removed by the user. The fastener components 23, 18 and 17 in actuality are quite thin and do not form any noticeable protrusions on the periphery of the adapter wheel. The thicknesses of these elements has been exaggerated in FIG. 3 for clarity of illustration.

While the band 13 forming the body of the adapter wheel 12 is preferably straight or smooth in transverse cross section and of uniform thickness around its circumference, in some case, anti-skid ribbing could be formed on the band 13 to improve wheel traction. Additionally, in some cases, radially inwardly extending side flanges could be provided on the band 13 around its circumference to preclude sand or the like from accumulating on the interior of the adapter wheel and falling onto the wheel bearings. However, the simpler form of the invention illustrated in the drawings is preferred because the device is very convenient to install or remove and adjust as constructed.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

We claim:

1. A wheelchair adapter wheel comprising an encircling band which is thin in gage and having a width that is wide in comparison to the width of a wheelchair propelling wheel and having separated first and second ends forming a space therebetween and being adapted to be placed around the circumference of a wheelchair propelling wheel, means on the interior of said band engageable with a wheelchair propelling wheel to center said band relative to said propelling wheel, and an elastic connector means across the space between said separated first and second ends of the band including a stretchable web on the exterior surface of the band having substantially the same width as the band, a first connector plate having a width substantially the width of said band and extending laterally across said band and secured to one end of the stretchable web, means anchoring the first connector plate and said one end of the stretchable web to the exterior of the band near and somewhat circumferentially spaced from said first end of the band, a second connector plate having a width substantially the width of said band and extending laterally across said band and secured to the other end of the stretchable web and being adapted to extend across the space between said separated first and second ends, said second connector plate having a leading end overlaying the exterior surface of said band adjacent the second end with radially inwardly extending claws, and the band being provided near its second end with at least one set of apertures formed therethrough to releasably receive said claws when said web is being stretched circumferentially of the adapted wheel and is under tension, whereby said web and second connector plate are in overlaying contact with substantially the entire width of the exterior surface of and in substantially the same circumferential plane of the band when said claws are received in said apertures and said stretchable web is under tension.

2. A wheelchair adapter wheel as defined in claim 1, wherein a wheelchair propelling wheel includes a tire on which the wheelchair adapter wheel is adapted to be connected, and said means on the interior of said band comprising a plurality of circumferentially spaced substantially half-circle centering elements adapted to embrace the tire of a wheelchair propelling wheel.

3. A wheelchair adapter wheel as defined in claim 1, and said stretchable web comprising a rubber web, said band being formed of sheet metal of a uniform thickness throughout its width and circumference.

4. A wheelchair adapter wheel as defined in claim 1, and the first and second connector plates being formed to provide spaced wall portions between which folded end portions of said web are engaged and firmly crimped into place.

5. A wheel chair adapter wheel is defined in claim 4, and said means anchoring the first connector plate comprising radial fastener elements which penetrate the connector plate, web and said band.

6. A wheelchair adapter wheel as defined in claim 1, and said claws being somewhat reversely inclined toward the connection of the second connector plate with the stretchable web so that they will not tend to separate from said apertures of the band.

7. A wheelchair adapter wheel as defined in claim 6, in which said band has opposite circumferential edges, and said claws and apertures being in laterally spaced relationship across the band with at least a pair of the claws and apertures being located near the opposite circumferential edges of the band.

8. A wheelchair adapter wheel as defined in claim 7, and a second set of said apertures formed through said band and being spaced somewhat circumferentially from said one set of apertures.

* * * * *